July 17, 1951  A. VAN DUYN  2,560,671
SLICING MACHINE FOOD PUSHER
Filed May 14, 1948  2 Sheets-Sheet 1
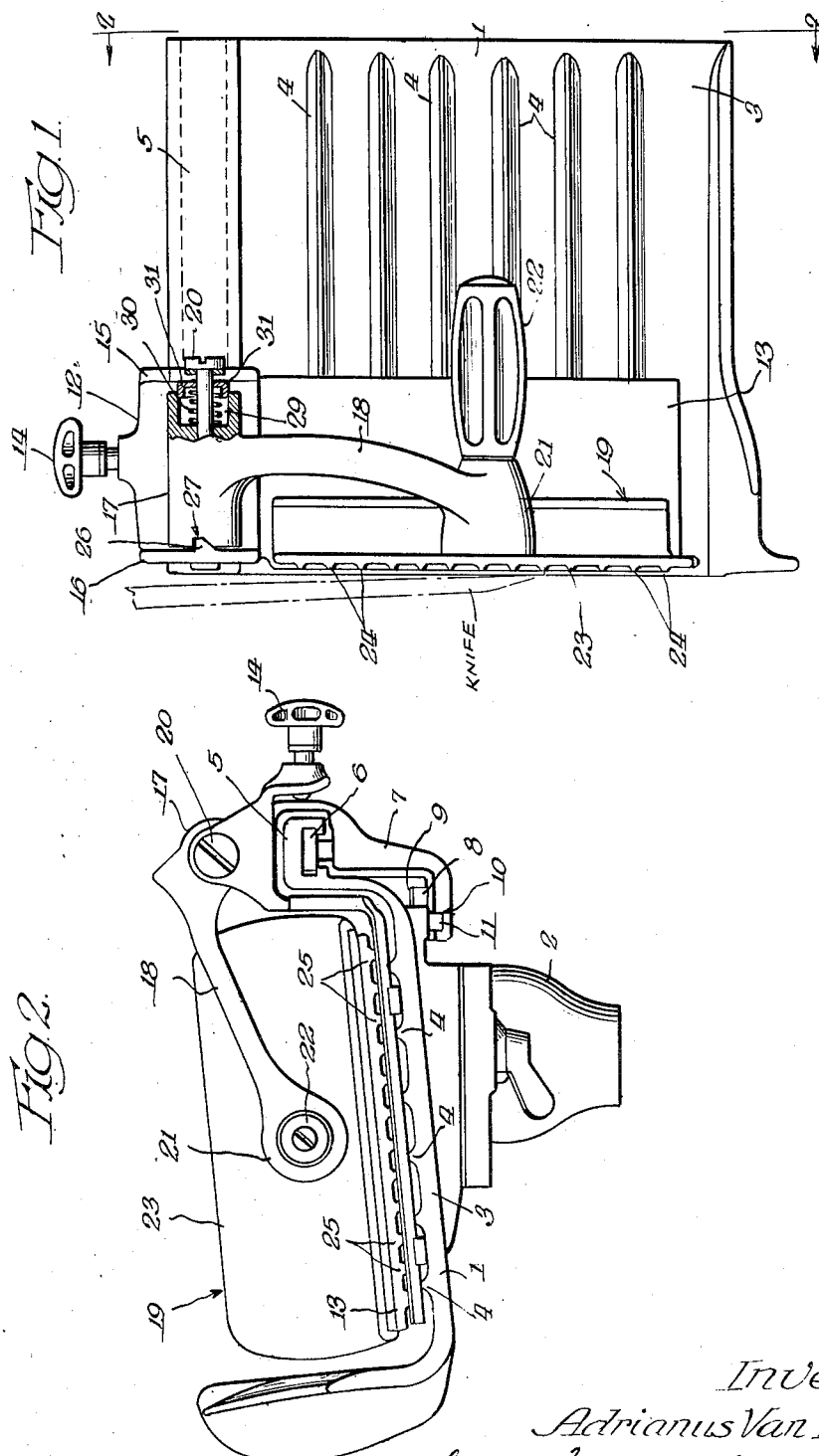
Inventor
Adrianus Van Duyn
By: Spencer Margall, Johnston & Cook
Attys July 17, 1951     A. VAN DUYN     2,560,671
SLICING MACHINE FOOD PUSHER
Filed May 14, 1948     2 Sheets-Sheet 2
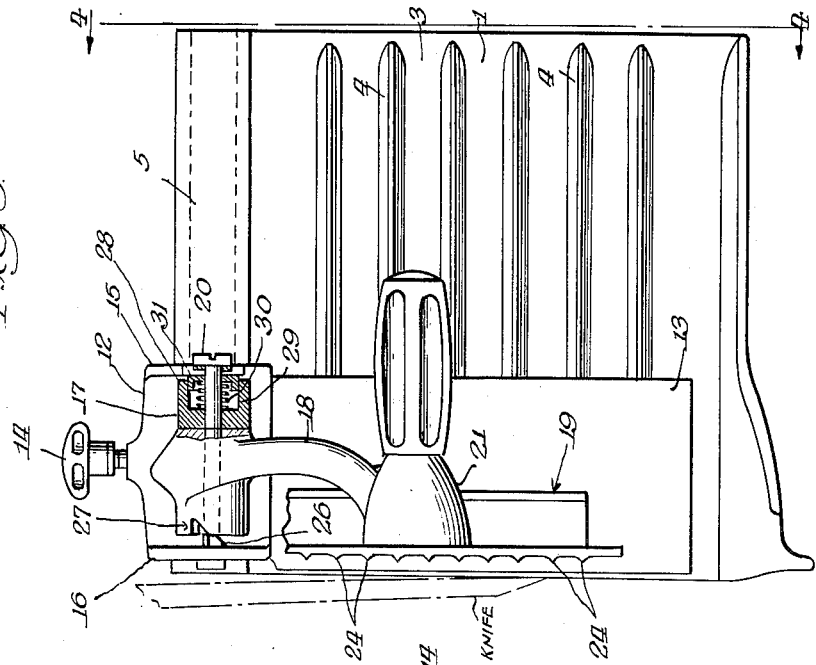
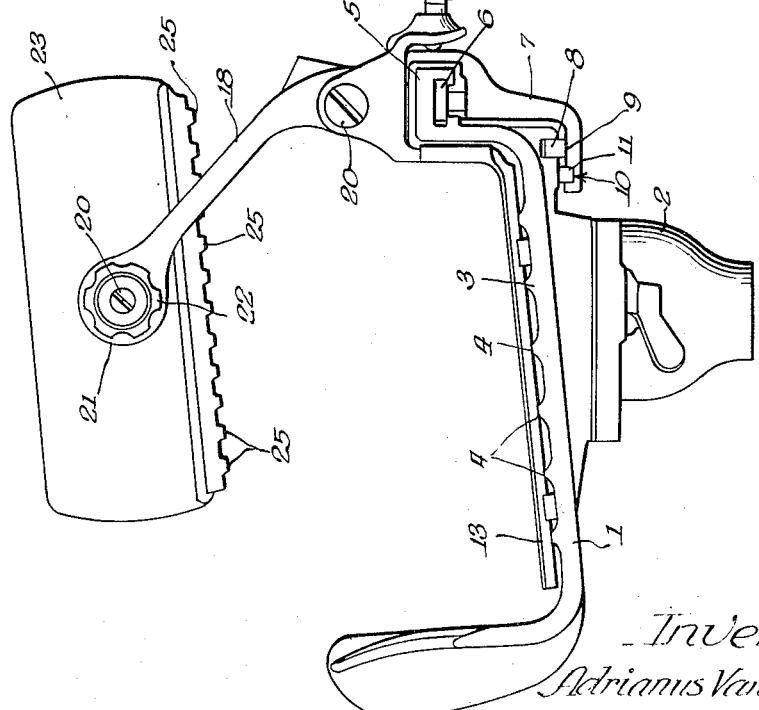
Inventor
Adrianus Van Duyn
By: Spencer, Marzall, Johnston & Cook,
Attys Patented July 17, 1951

2,560,671

UNITED STATES PATENT OFFICE 2,560,671

SLICING MACHINE FOOD PUSHER

Adrianus van Duyn, Hillegersberg, Rotterdam, Netherlands, assignor to U. S. Slicing Machine Company, Inc., La Porte, Ind., a corporation of Indiana Application May 14, 1948, Serial No. 27,073
In Great Britain May 28, 1947

3 Claims. (Cl. 146—102)

This invention relates to slicing machines in general and particularly to slicing machines of the push pull type. More specifically, the invention relates to a slicing machine food pusher which engages behind the substance to be sliced and feeds the substance in a step by step movement across the food table so that it may be sliced properly by a rotating knife.

There are numerous devices for pushing or feeding the substance to be cut to a gauge plate so that slices may be cut from the substance when the food table is reciprocated past the slicing knife. Many of these food pushers are displaceable by being moved away from the food table so as not to obstruct the loading or unloading of the substance on the food table. Many of these devices also may be used to clamp the substance on the food table. The conventional food tables, however, ordinarily are engaged by certain projecting parts which overhang and obstruct the food pusher when it is raised as it reaches the end of its pushing travel. One obstruction which normally interferes with the raising of the food pusher, when it is at or near the end of its pushing travel, is the knife sharpening apparatus overhanging a part of the knife. These conventional food pushers are unsatisfactory in that the shifting movement of the pusher plate will strike an overhanging part of the slicing machine whereupon the pusher plate is likely to become damaged, or the pusher plate may damage certain parts of the machine including the knife itself.

The primary object of the present invention is the provision of new and novel means for overcoming the inherent disadvantages in conventional pusher plates as well as for providing a new and novel pusher plate construction whereby a pusher plate, which sliding engagement with respect to the food table, may be shifted laterally to prevent the plate from striking parts of the machine when the pusher plate is shifted in a vertical plane.

Another important object of the invention consists in the arrangement and construction of certain operating and cooperating parts to permit normal free and easy perpendicular as well as sliding movement of the pusher plate and still cause the pusher plate to be shifted by means of a spring action to prevent the pusher plate from striking overhanging parts when the pusher plate is shifted from operative to inoperative position.

Numerous other objects and advantages will be apparent through the progress of the specification which follows:

The accompanying drawings illustrate a selected embodiment of the invention and the views therein are as follows:

Fig. 1 is a top plan view of a slicing machine food table and embodying the improved pusher plate of the invention, the pusher plate being in its normal operative position on the food table;

Fig. 2 is a detail side elevation view looking in the direction of the arrows 2—2 of Fig. 1;

Fig. 3 is a view similar to Fig. 1, but showing the pusher plate in its raised or inoperative position; and Fig. 4 is a detail elevational view looking in the direction of the arrows 4—4 of Fig. 3.

The particular construction herein shown for the purpose of illustrating the invention comprises a food table or support 1 which is operatively secured to an upright or arm 2. The arm 2 is adapted to be operatively supported by the usual slide carriage so that the food table may be reciprocated longitudinally past the cutting edge of the usual circular rotating cutting knife. The food table 1 is adapted to be positioned perpendicularly with respect to the slicing plane of the knife so that substance mounted on the food table may have slices cut therefrom a thickness equal to the distance between the slicing plane and the usual gauge plate.

The food table 1 may comprise a flat bottom 3 which may be slightly tilted, as desired as shown in Figs. 2 and 4. The top of the food table 1 may be provided with a plurality of longitudinally spaced upwardly extending ribs 4 which extend longitudinally of the plate and transversely of the slicing plane of the knife. The sides of the food table 1 may project upwardly as clearly shown in Figs. 2 and 4, and the side 5 of the table 1 may be provided with a T-shaped slot on its under surface. This T-shaped slot is adapted to receive a T-shaped rod 6 which is made integrally with a leg 7 fixed to a part of the pusher plate assembly. The leg 7 to which the member 6 is secured, may be provided with an upstanding member 8 receivable in a notch 9 formed on the underside of the food table 1. The turned end of the member 7 may be provided with a slot 10 to receive a projection or finger 11 projecting from the bottom of the food table. The pusher plate assembly is, therefore, supported by the food table and has slidable movement thereon. The members 8 and 11 may act as stops for limiting the slidable movement of the food pusher on the table.

A pusher plate support or housing 12 is secured rigidly to the member 7 and may include an over table 13 which is adapted to lie on top of the upper surface of the food under table 1. The support 12 may be adjustably or removably secured to the leg or member 7 by means of one or more thumb nuts 14. The support or housing 12 is provided with upstanding opposed end walls 15 and 16 in the form of integral ears. A barrel-like hub or boss 17 is arranged between the end walls 15 and 16, and is connected integrally to a pusher arm 18 which is fastened to a pusher plate construction 19. An axle pin 20 passes through the hub 17 and pivotally supports the hub between the opposed walls 15 and 16.

The pusher arm 18 is preferably made integral with the hub 17 and terminates in an integral boss-like enlargement 21. An operating handle 22 is pivotally secured to the enlargement 21 to operate the pusher plate arrangement 19.

The pusher plate construction 19 comprises a vertically disposed flat plate 23 which is mounted on the inner end of the enlargement 21, which enlargement and handle 22 are used to raise and lower the plate 23 into and out of position between the sides 5 of the food table 1. The front surface of the plate 23 may be provided with a plurality of relatively sharp spaced projections or ribs 24 to engage behind the substance on the over table and assist in preventing the substance from shifting during the slicing operations. The bottom edge of the plate 23 may be provided with a plurality of projections 25 which are adapted to engage and bite into the upper surface of the substance when the pusher plate 23 is used as a clamp.

The pusher plate assembly 19 is adapted to be slid transversely of the slicing plane throughout the entire length of the food table. The pusher plate 23 is constructed so that it may be used either as a pusher engaging behind the substance, or it may be used as a clamp by engaging the upper surface of the substance.

The pusher normally lies in the position shown in Figs. 1 and 2 where it is slidable along the food table, whether it engages behind the substance, or clamps it at the top. It is desirable, however, that the pusher plate be capable of being swung out of position and maintained in such an inoperative position for various purposes, particularly for loading and unloading the food table, as well as for cleaning purposes. The pusher plate 23 is adapted to be maintained in an upper inoperative position as shown in Figs. 3 and 4 or in a lower operative position as shown in Figs. 1 and 2. The means for holding the pusher plate in its inoperative position is accomplished by frictional engagement of certain parts. It is desirable and preferable that the face of the pusher plate extend substantially to the cutting plane of the knife for practical purposes so that the substance may be fed fully, or nearly so, leaving the end piece of the substance as small as possible. It is also desirable and preferable that the pusher plate be shifted away from the cutting plane should the pusher plate be raised and not strike any part of the machine which may overhang the machine. The mechanism for automatically shifting the pusher away from the cutting plane, or in fact shifting the pusher rearwardly from the slicing zone at any position of travel of the pusher, may comprise a lug or finger 26 formed on the end wall 16 engaging a complementary notch or slot 27 formed on the hub 17.

One side of the lug or finger is inclined to form a cam-like surface which cooperates with an inclined side or cam surface on one side of the notch 27.

The end 28, of the hub 17, is hollow to provide a recess or chamber 29 into which a coil spring 30 is arranged. The spring 30 encircles the axle pin 20 and is confined between the end wall 15 and the end of the opening 29 which is defined by a wall. The spring 30, therefore, urges the hub 17 toward the end wall 16 and maintains the leg 26 in engagement with its operating notch 27 when the pusher is in lowered position. The distance between the end walls 15 and 16 is greater than the length of the hub 17, therefore, the hub has limited slidable movement between the walls 15 and 16. The spring 30 tends to urge the hub 17 against the end wall 16, keeping the lug and notch in registration. A flanged washer 31 is arranged between the wall 15 and the spring 30 as shown in Figs. 1 and 3. The pusher plate assembly, however, may be swung on its pivot 20, and when so swung, the lug 26 will become disengaged from its complementary slot 27. When the finger 26 and the slot 27 are out of registration, the lug 26 will engage the end wall of the hub 17 and shift the pusher plate to the position as shown in Figs. 3 and 4. When the pusher plate is lowered from the position shown in Figs. 3 and 4, to the position shown in Figs. 1 and 2, the lug 26 will again be received in the notch 27 and the parts will be in the position shown in Figs. 1 and 2.

The pusher plate is in its operative position shown in Figs. 1 and 2 whereby the finger 26 on the end wall 16 is in engagement with the notch in the hub. When the handle 22 is operated to raise the plate, the hub 17 will pivot in a vertical arc about the axle pin 20, whereupon the cam surface of the slot 27 will ride on the cam surface of lug 27 and shift the hub inwardly against the tension of the spring. The lug 26 then rides on the end surface of the hub, the spring pressure holding the parts in vertical position as shown in Figs. 3 and 4. Lowering movement of the plate will bring the slot 27 in position for registration with the pin, the pin snapping into the slot by the pressure exerted by the spring.

The invention provides a pusher plate which is adapted to have longitudinal slidable movement with respect to the food table with which it cooperates. The pusher also has pivotal movement, but when raised, the pusher is shifted so as to move it away from any overhanging parts. Free slidable movement of the pusher plate is maintained at all times while in its operative and inoperative positions. The pusher plate is adapted to be displaceable with respect to the food table by merely moving the pusher plate upwardly. The upward movement of the pusher causes the slot in the hub to become disengaged from the lug on an end wall whereby the pusher plate will shift away from the end wall 16 so that the pusher will not strike any overhanging parts, even though the pusher is adjacent the cutting plane of the knife. The pusher plate of the invention is strong and durable in construction, eliminates all unnecessary parts, prevents the plate from fouling or contacting any overhanging parts of the machine, and may be readily and economically manufactured.

Changes may be made in the form, construction and arrangement of the parts without departing from the spirit of the invention or sacrificing any of its advantages and the right is hereby reserved to make such changes as fall fairly within the scope of the following claims.

The invention is hereby claimed as follows:

1. A slicing machine comprising a reciprocal food carriage, a food pusher adapted for slidable movement on said carriage, a pusher support carried by the carriage, a pair of spaced walls on the support, an axle supported by said walls, a hub pivoted on said axle, said hub being shorter than the distance between said walls, an arm on the hub, a plate on the arm whereby the plate may be swung in a vertical arc, and a cam finger on one wall, said hub having a cam notch in a side thereof receiving said finger when the pusher plate is in an operative position, said finger engaging a side wall of said hub and urging the hub laterally a distance equal to the length of the finger when the pusher is pivoted about the axle pin in a vertical arc, whereby the pusher plate is shifted so as to prevent the pusher plate from striking objects on the machine when the plate is adjacent the slicing plane.

2. A slicing machine comprising a reciprocal food carriage, a food pusher adapted for slidable movement on said carriage, a pusher support carried by the carriage, a pair of spaced walls on the support, an axle supported by said walls, a hub pivoted on said axle, said hub being shorter than the distance between said walls, an arm on the hub, a plate on the arm whereby the plate may be swung in a vertical arc, a cam finger on one wall, said hub having a cam notch in a side thereof receiving said finger when the pusher plate is in an operative position, said finger engaging a side wall of said hub and urging the hub laterally a distance equal to the length of the finger when the pusher is pivoted about the axle pin in a vertical arc, whereby the pusher plate is shifted so as to prevent the pusher plate from striking objects on the machine when the plate is adjacent the slicing plane, and means urging the hub toward one wall.

3. A slicing machine comprising a reciprocal food carriage, a food pusher adapted for slidable movement on said carriage, a pusher support carried by the carriage, a pair of spaced walls on the support, an axle supported by said walls, a hub pivoted on said axle, said hub being shorter than the distance between said walls, an arm on the hub, a plate on the arm whereby the plate may be swung in a vertical arc, a cam finger on one wall, said hub having a cam notch in a side thereof receiving said finger when the pusher plate is in an operative position, said finger engaging a side wall of said hub and urging the hub laterally a distance equal to the length of the finger when the pusher is pivoted about the axle pin in a vertical arc, whereby the pusher plate is shifted so as to prevent the pusher plate from striking objects on the machine when the plate is adjacent the slicing plane, means urging the hub toward one wall, and a spring surrounding the axle pin and urging the hub in a predetermined direction to maintain the finger in the notch when the plate is in operative position.

ADRIANUS van DUYN.

REFERENCES CITED

The following references are of record in the file of this patent:

UNITED STATES PATENTS

| Number | Name | Date |
| --- | --- | --- |
| 2,005,109 | Reed et al. | June 18, 1935 |
| 2,087,899 | Campbell | July 27, 1937 |
| 2,102,180 | Johnston | Dec. 14, 1937 |
| 2,126,380 | Folk | Aug. 9, 1938 |
| 2,151,862 | Meeker et al. | Mar. 28, 1939 |
| 2,199,267 | Meeker et al. | Apr. 30, 1940 |
| 2,291,260 | Streckfuss et al. | July 28, 1942 |
| 2,404,557 | Wood | July 23, 1946 |

FOREIGN PATENTS

| Number | Country | Date |
| --- | --- | --- |
| 519,292 | Great Britain | Mar. 20, 1940 |
| 612,873 | Great Britain | Nov. 18, 1948 |